United States Patent [19]

Hanson

[11] 4,235,429
[45] Nov. 25, 1980

[54] SELF-CONTAINED VISE AND SUPPORT ASSEMBLY

[76] Inventor: Palmer C. Hanson, Manitowish Waters, Wis. 54548

[21] Appl. No.: 72,018

[22] Filed: Sep. 4, 1979

[51] Int. Cl.³ ............................................. B23Q 1/04
[52] U.S. Cl. .................................... 269/71; 269/209; 269/239
[58] Field of Search ................... 269/208, 209, 45, 71, 269/77–78, 95, 239, 246

[56] References Cited

U.S. PATENT DOCUMENTS

| | | | |
|---|---|---|---|
| 494,882 | 4/1893 | Olson | 269/209 |
| 1,670,253 | 5/1928 | Gilbert et al. | 269/45 |
| 4,089,513 | 5/1978 | Mock | 269/97 |

FOREIGN PATENT DOCUMENTS 7431579  4/1976  France ...................................... 269/239

*Primary Examiner*—Robert C. Watson
*Attorney, Agent, or Firm*—Edward D. Gilhooly

[57] ABSTRACT

A self-contained vise and support assembly including two jaw members urged together by screw or other appropriate devices to clamp a desired work piece therebetween. The jaw members comprise one member rigidly fixed to the vise base and one movable member pivotably mounted upon the vise body capable of freely changing position and orientation relative to the fixed jaw member in order to accommodate a multitude of different work pieces. The vise itself is supported by a support assembly permitting free movement and adjustment about a plurality of axes. The support assembly possesses the capability of being mounted or affixed to a large number of existing work tables or surfaces for greater versatility of use.

9 Claims, 8 Drawing Figures

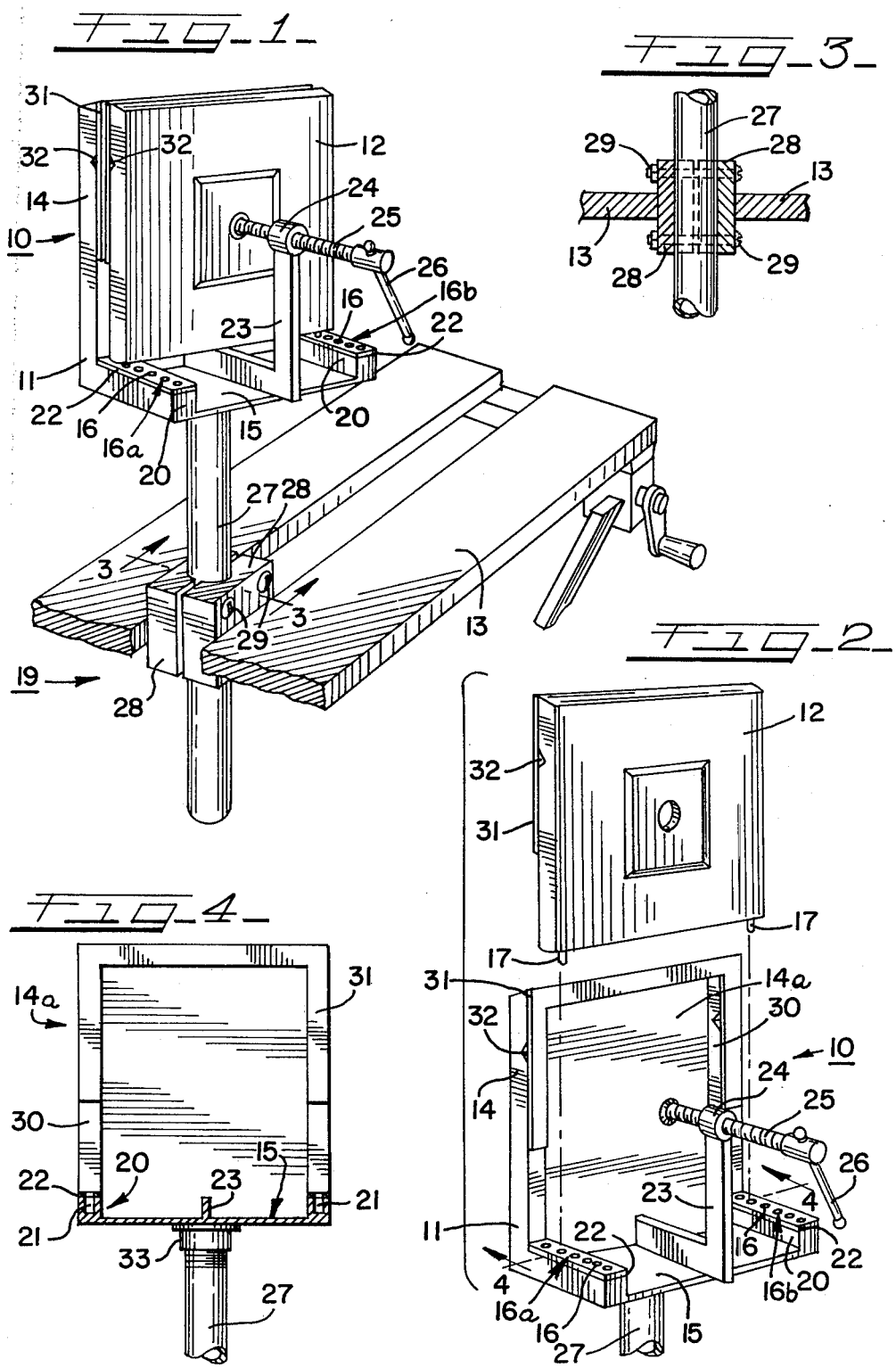

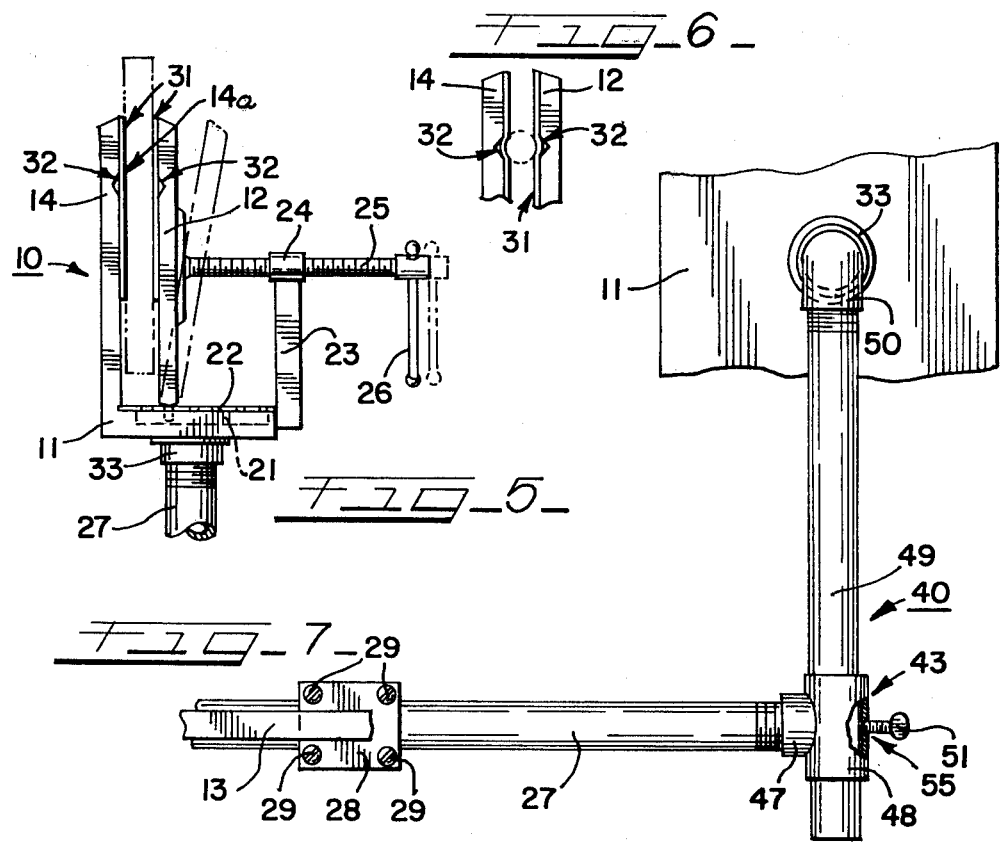
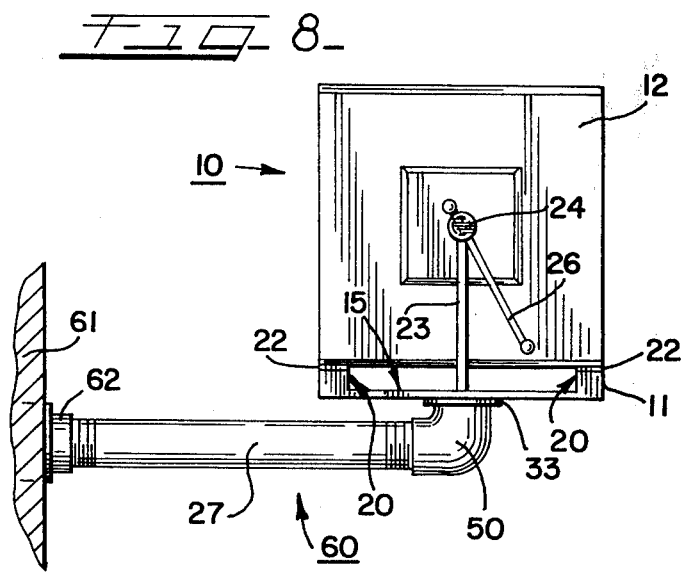

ns4,235,429

SELF-CONTAINED VISE AND SUPPORT ASSEMBLY

BACKGROUND OF THE INVENTION

The present invention relates in general to vises and clamping apparatus and, in particular, to independently operable, jaw type vises capable of clamping a plurality of work pieces of a wide range of materials, shapes and sizes.

More specifically, this invention relates to an improved device having a pair of jaw means, one pivotably and adjustably mounted in relation to the fixed position of the other, for clamping a work piece therebetween. The pivotably mounted jaw is pivotably carried by a novel mounting technique, providing ease and versatility in use of the vise of the invention. The vise herein disclosed is also capable of being situated in a plurality of various positions by an improved support means allowing freedom of movement and adjustment about a plurality of axes.

Vises and other clamping devices are crucial tools in many industrial and domestic applications frequently encountered. In use, they are often required to handle work pieces of various materials, shapes, and sizes for numerous purposes, thereby requiring substantial versatility in use and design. Moreover, vises often are required to clamp effectively such objects from a variety of types of support tables, and the like, at convenient positions to permit operations on the work pieces being clamped.

Typically, in order to fulfill these requirements prior art devices employ a movable jaw in conjunction with a rigidly fixed clamping member urged together into a clamping mode by screw or other force-applying means. Support of the device is most often furnished by a work table or work surface to which the vise is rigidly affixed by a wide range of techniques. In fact, in numerous prior art devices, a work table itself acts as the rigidly fixed clamping jaw member as well as the support means for the device as a whole. Support of the device solely on the work table greatly limits the versatility and overall convenience of use of the vise. An example of such a limited support means is disclosed in U.S. Pat. No. 494,882 to Olson for "Bench Clamp" having a single jaw configuration and functioning only while being affixed to a work table. The utility and applicability of this type of device is severely limited when sought to be used upon odd work piece configurations and orientations as well as in confined work areas.

Some prior art vises, such as shown in the Olson patent, also retain the vise assembly at a hinged point to allow limited rotational movement in an attempt to increase its versatility. However, a single hinge as in Olson is deficient by only allowing a limited angle of rotation about a single axis.

The prior art shows numerous vise configurations with many different schemes for affixing or positioning the vise to the work table. In each patent, the device is shown and described in the optimal functioning position, whether it be fixed vertically, horizontally, or a combination thereof, relative to the work surface. When affixed, the vise is for all practical purposes permanently in that position and will remain so until removed with considerable effort. Clearly, a permanent mounting is wholly unsatisfactory in permitting portability and utility of the vise.

SUMMARY OF THE INVENTION

It is, therefore, an object of this invention to improve vises and the like;

a further object of this invention is to provide a vise which is supported, for a multitude of operations, by adjustment and movement about a plurality of axes;

another object of the invention is to provide effective and convenient clamping of a plurality of work pieces, sizes and shapes through the ability to quickly and easily alter the special relation of a pivoted clamp surface with a fixed clamp surface without requiring substantial fitting and adjustment procedures;

a still further object of the invention is to provide a vise capable of easy attachment to a variety of existing work tables and surfaces;

still another object of the invention is to provide an uncomplicated vise assembly giving rise to manufacturing economy and simplicity in use.

These and other objects are attained in accordance with the present invention wherein there is provided a vise assembly having two clamping jaw means, one rigidly fixed in relation to the vise body, the other movable and pivotable about vertical pins placed in corresponding apertures in the vise body. With this novel configuration, the effort required in removing and changing the position of a pivotal jaw member is minimized by the elimination of alignment or "threading" procedures necessitated in the prior art.

The vise is supported by a novel support means such that it can be moved and adjusted about a plurality of axes to any angle desired and still remain fully functional, as well as affording the capability of being easily mounted or affixed to a multitude of existing work tables or surfaces, thereby affording versatility and portability not heretofore available.

The exact manner in which the foregoing and other advantages and objects are obtained in practice will become more clearly apparent when reference is made to the following detailed description of the preferred embodiments of the invention set forth by way of example and shown in the accompanying drawings, wherein like reference numerals indicate corresponding parts throughout.

DESCRIPTION OF THE DRAWINGS

Further objects of this invention, together with additional features contributing thereto, it will be apparent from the following description of several embodiments of the invention when read in conjunction with the accompanying drawings wherein:

FIG. 1 is a side and frontal perspective view showing the self-contained vise and support assembly of the invention in an operative position supported by a conventional work table;

FIG. 2 is a vertical side and frontal perspective view of the self-contained vise of FIG. 1 with a portion of the vise assembly shown in an exploded illustration;

FIG. 3 is a partial vertical sectional view of the support assembly taken along lines 3—3 of FIG. 1;

FIG. 4 is a frontal, partially sectional view of the self-contained vise assembly of the invention taken along lines 4—4 of FIG. 2;

FIG. 5 is a side view of the self-contained vise of FIG. 1 in an alternate operative position and work piece shown in phantom;

FIG. 6 is a vertical side view of a section of the self-contained vise showing an alternate clamping function with a work piece shown in phantom;

FIG. 7 is a vertical rear view of a second embodiment of the support assembly of the invention with a portion broken away to show the adjustment means;

FIG. 8 is a front vertical view of the self-contained vise and support assembly showing an alternate embodiment of support assembly of the invention affixed to a vertical mounting surface.

DESCRIPTION OF THE PREFERRED EMBODIMENTS OF THE INVENTION

Referring now to the drawings in greater detail, in FIG. 1, there is shown a perspective view, generally designated 10, of the self-contained vise assembly in combination with a support apparatus 19, all supported by a conventional work table 13. The vise assembly 10 includes a main vise body member 11 in combination with a pivotable and movable jaw member 12 which is pivotably mounted upon the main vise body member 11 so as to permit freedom of movement and orientation relative thereto, as is shown in phantom in FIG. 5.

The main vise body member 11, when viewed from the side as in FIG. 5, possesses an approximate "L" shape, although member 11 may be formed in other suitable configurations (not shown). The "L" shape of a body member is created by upward extending portion 14 having a fixed planar surface 14a serving as the second jaw member against which the pivotable and movable jaw member 12 acts when clamping a desired work piece therebetween as shown in phantom in FIGS. 5 and 6. A portion 15 of the main vise body 11, disposed normal to portion 14, serves as a mounting base upon which the movable jaw member 12 is pivotably secured at a selected position.

The pivotable jaw is selectably insertable, for pivotal movement, into an aligned pair of a plurality of apertures 16 arranged in parallel rows 16a and 16b extending perpendicular to the plane of the clamping surface of jaw 14 and positioned in raised shoulders 20 on each edge of the portion 15 of body 11, as shown in FIGS. 1, 2 and 4. These apertures are positioned so that a respective aperture in row 16a and row 16b aligns with a pair of spaced support pins 17 extending down from the bottom of the pivotable and movable jaw member 12. The raised shoulders 20 include longitudinally extending open channels 21 covered by a strip of metal 22, attached thereto by any suitable technique whereby the apertures 16 are disposed through the strip 22. The pins 17 pivotably engage with the corresponding apertures 16 at a desired distance from the fixed jaw member 14 so as to provide a fixed pivot point, while permitting simple and quick removal and refitting of the pivotable jaw member 12. It should be apparent that the open channels beneath strips 22 permit the jaw 12 to be angularly adjusted relative to jaw member 14 to adapt to various configurations of work pieces to be accommodated.

As shown in FIGS. 1, 2 and 4, a force-applying support post 23 is integrated directly into the horizontal vise base member 15 to position and support a force-applying assembly utilized in clamping operations. The force-applying assembly shown includes the above mentioned support posts in combination with a fixed screw nut 24, having an axis of rotation parallel to the horizontally extending portion 15 of base member 11 and perpendicular to the upwardly extending base member 14 as shown in FIGS. 1, 2 and 5. The nut 24 is mounted atop the support post at such a height that the transversely-extending screw 25 inserted therethrough abuts the pivotal jaw member 12 at or about its midpoint thus delivering the required clamping force at that point along an axis. The screw 25 is equipped at its outer end with a suitable handle 26 for conveniently turning the screw inward or outward to clamp a desired work piece in place. It is within the scope of the invention to utilize other forms of force-applying devices in conjunction with the vise herein disclosed, other than the means herein disclosed.

Referring now to FIGS. 2 and 4, wherein there is shown the vise assembly 10 depicted in FIG. 1 without the entire support means 19 and with the pivotable jaw member 12 thereof in an exploded view to reveal portions of the vice not visible in FIG. 1. In this position, it is evident that the vertically and horizontally extending portions of the vise body are not uniformly flat but instead, channel-like with raised shoulders 30 about the periphery of the jaws raised so as to engage the corresponding portion of the pivotable jaw member 12 during clamping procedures. This configuration allows a greater variety of articles to be clamped as well as enabling the incorporation of a rubber, or like material, as a jaw padding 31 to be placed on the upper portion of the clamping jaw shoulders 30, as shown in FIG. 4, as a precaution against marring working pieces during clamping procedures.

Referring now to FIG. 6, there is shown a partial, side view of the top of the clamping jaws 12 and 14, engaged in an alternative clamping function. This alternative function is obtained through the addition of triangular indentations or notches 32 placed in the vertically extending portions of the clamping jaw shoulders 30 at equivalent distances from the top of each jaw member 12 and 14, as shown in FIGS. 1, 2 and 5. The addition of these notches to each jaw member enables the operator to fixedly clamp circular or tubular objects not clampable by ordinary means.

Also shown in FIG. 1 is one form of support assembly of the invention employed to adjustably support the vise during clamping operations. The support assembly 19 depicted utilizes a support member 27 in combination with two support blocks 28 acting in unison. The upper end of the support member 27 is fixed to the underside of the horizontally extending vise body portion 11 by a threaded connection 33 or other appropriate means, as shown in FIGs. 4, and 5. The support blocks 28 are situated such that they surround the support member 27 to be clamped thereto via screw means 29 positioned on either side of the support member, as shown in FIG. 3. With these support blocks 28 positioned as desired and fixed to the support member, they are placed between the jaws of a vise or work table assembly 13, thereby supporting the vise of the invention at a desired angular and axial position thereabove upon tightening of screw means 29.

In addition to the embodiment support assembly described with reference to FIG. 1, other modifications of the support assembly of the invention are shown in FIGS. 7 and 8. The embodiment shown in FIG. 7 includes an alternate support assembly 40 utilizing the support blocks as shown in FIGS. 1 and 3 in combination with an adjustable coupling 43 providing additional versatility in support orientation and adjustment. The adjustable coupling shown in FIG. 7 is fixed to the support member 27 via threading or other appropriate means 47 in much the same way as described in FIG. 1, which in turn is supported by an existing work table 13 and the support block assembly 28 previously discussed. The coupling 43 has a sleeve 48 affixed to the threaded support member 27 such that a secondary support member 49 inserted therethrough is at right angles with the primary support member 27. The secondary support member 49 is threadedly coupled to a right angled elbow 50 which in turn is coupled to socket 33 of the vise. A screw or other appropriate fastening means 51 is threaded through an aperture 55 in the sleeve 48 at a point opposite to the primary support member threaded connection 47 such that it abuts the secondary support member 49 and fixes it in a desired position. Thus, the support assembly 40 permits the vise to be angularly adjusted about the axis of member 49, to be moved along the axis of member 49 to adjust height and to be angularly adjusted about the axis of member 27 as well as being movable along the axis of member 27 via adjustment of the clamp blocks. Additional mobility is permitted by the right angled elbow 50, which allows angular adjustment about the axis of member 49 as well as angular adjustment about an axis normal to the axis of member 49.

Referring to FIG. 8, there is illustrated the other modification of the support assembly of the invention, generally designated 60, whereby coupling 43 and support member 49 are eliminated and elbow 50 is attached directly to member 27. Support member 27 in turn is adjustably connected directly to an existing work surface 61 by a threaded or other appropriate connection 62. The support assembly 60 depicted therein permits the adjustments allowed by the right angled elbow 50 as described above in addition to angular adjustment about the axis of member 27 permitted by coupling 62.

In the foregoing description there has been disclosed several embodiments of an improved vise and support assembly. It is within the scope of the invention that the components of the various embodiments can be assembled and fixed into their operative configuration by using screw or other appropriate fastening means, such that efforts required in assembly and disassembly are greatly reduced as well as permitting quick and efficient replacement of worn or damaged elements thereof.

It will thus be seen that the present invention provides a novel vise and support apparatus, said apparatus having a number of advantages and characteristics including those referred to specifically herein, and others which are inherent in the invention. It is anticipated that, a representative embodiment only having been shown by way of example, various modifications and changes to the apparatus described will occur to those skilled in the art and such changes may be made without departing from the spirit of the invention or the scope of the appended claims.

What is claimed is:

1. A self-contained vise and support assembly comprising, a base means forming a fixed clamping surface, and including a portion having at least one channel extending outward from said fixed clamping surface, a jaw member forming an adjustable clamping surface confronting said fixed clamping surface to retain an object therebetween, a flat strip member lying over said at least one channel, said strip member having a plurality of apertures opening toward said jaw member and disposed in a plane lying substantially perpendicular to the plane of said fixed clamping surface, attachment means coupled to said jaw member and having a projecting portion extending therefore to a free end, said attachment means to selectively engage at least one aperture of said strip member, said free end of said attachment means being capable of unrestrained movement within said channel during engagement with said strip member, said attachment means being restrained by said strip member in said at least one aperture at a point spaced from said free end of said projecting portion of said attachment means and providing unrestrained pivotable movement of said jaw member about the point of restraint of said attachment means, and force applying means for applying force to said pivotally mounted jaw member to selectively urge said adjustable clamping surface toward said fixed clamping surface for clamping an object between said clamping surfaces.

2. A vise and support assembly as defined in claim 1, wherein said said portion of said base means is disposed perpendicular to said fixed clamping surface.

3. A vise and support assembly as defined in claim 1 wherein said at least one channel includes a pair of channels, a flat strip lying over each of said channels and having apertures to form two rows of apertures extending outwardly along respective lines perpendicular to said fixed clamping surface.

4. A vise and support assembly as defined in claim 3, wherein said rows of apertures are parallel to each other.

5. A vise and support assembly as defined in claim 1, wherein said attachment means include at least one pin to be selectively inserted in an aperture to permit pivotal movement of the jaw member.

6. A vise and support assembly as defined in claim 5 wherein said pin means includes two pin members positioned on the jaw member.

7. A self-contained vise and support assembly as defined in claim 1, further comprising a support assembly to support said base means, said support assembly having support means for supporting said base means at a selected position, said support means having a coupling means to attach said support means to a support structure.

8. The self-contained vise and support assembly as defined in claim 7 wherein said support means includes a support member carrying said base means and being operatively coupled to said coupling means for relative angular movement, said base means being attached to said support member by a second coupling means having a portion thereof extending perpendicular to said support member, said second coupling means permitting rotational movement about said support member, and said second coupling means further permitting selective pivotal movement about the axis of the said support member.

9. The self-contained vise and support assembly according to claim 1 further comprising support means for coupling said base means to a support structure, said support means including adjustment means to adjust the position of said base means relative to the support structure.

* * * * *